US011326419B2

(12) United States Patent
Ornelaz et al.

(10) Patent No.: US 11,326,419 B2
(45) Date of Patent: May 10, 2022

(54) DEBRIS TOLERANT FLUX GUIDED DOWNHOLE ROTATING MACHINE (71) Applicant: Halliburton Energy Services, Inc., Houston, TX (US)

(72) Inventors: Richard Decena Ornelaz, Frisco, TX (US); Michael Linley Fripp, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 184 days.

(21) Appl. No.: 16/440,637

(22) Filed: Jun. 13, 2019

(65) Prior Publication Data
US 2020/0149371 A1 May 14, 2020

Related U.S. Application Data (63) Continuation of application No. PCT/US2018/061014, filed on Nov. 14, 2018.

(60) Provisional application No. 62/611,038, filed on Dec. 28, 2017.

(51) Int. Cl.
*E21B 41/00* (2006.01)
*H02K 21/02* (2006.01)
*H02K 21/24* (2006.01)
*E21B 34/06* (2006.01)

(52) U.S. Cl.
CPC ....... *E21B 41/0085* (2013.01); *H02K 21/029* (2013.01); *H02K 21/24* (2013.01); *E21B 34/066* (2013.01)

(58) Field of Classification Search
CPC ... E21B 41/0085; E21B 34/066; H02K 1/165; H02K 1/2793; H02K 21/029; H02K 21/24
See application file for complete search history.

(56) References Cited

U.S. PATENT DOCUMENTS

| 5,586,083 | A | * | 12/1996 | Chin | ........................ | E21B 47/18 |
|---|---|---|---|---|---|---|
| | | | | | | 367/84 |
| 5,742,450 | A | | 4/1998 | Moser | | |
| 6,545,382 | B1 | | 4/2003 | Bennett | | |
| 6,756,719 | B1 | | 6/2004 | Chiu | | |
| 9,879,506 | B2 | | 1/2018 | Frosell et al. | | |

(Continued)

FOREIGN PATENT DOCUMENTS

| CN | 1615572 A | 5/2005 |
|---|---|---|
| CN | 202906721 U | 4/2013 |

(Continued)

*Primary Examiner* — Daniel P Stephenson
(74) *Attorney, Agent, or Firm* — Scott Richardson; Parker Justiss, P.C.

(57) ABSTRACT

A downhole rotating machine includes a stator having stator windings and corresponding magnetic flux guides and a rotor having a plurality of magnets configured to cooperate with the stator windings and the corresponding magnetic flux guides to generate a magnetic field in a magnetic gap that is substantially parallel to an axis of rotation of the rotor, wherein the magnetic gap provides a magnetic gap separation between the plurality of magnets and the corresponding magnetic flux guides that is at least five percent of an overall diameter of the downhole rotating machine. A method of operating a downhole tool in a wellbore and a downhole tool are also provided.

21 Claims, 6 Drawing Sheets (56) References Cited

U.S. PATENT DOCUMENTS

| | | | |
|---|---|---|---|
| 10,227,860 B1* | 3/2019 | McMullen | F04D 13/08 |
| 2005/0029900 A1 | 2/2005 | Hiramatsu | |
| 2008/0048530 A1 | 2/2008 | Peng et al. | |
| 2017/0234112 A1* | 8/2017 | Pawar | E21B 37/00 |
| | | | 166/311 |
| 2017/0248010 A1* | 8/2017 | Lee | E21B 47/24 |
| 2020/0063498 A1* | 2/2020 | Prevost | E21B 10/573 |
| 2020/0149371 A1* | 5/2020 | Ornelaz | H02K 21/029 |
| 2020/0295640 A1* | 9/2020 | Tegeler | H02P 9/107 |
| 2020/0362671 A1* | 11/2020 | Vick, Jr. | H02K 16/00 |

FOREIGN PATENT DOCUMENTS

| | | |
|---|---|---|
| EP | 1480317 A2 | 11/2004 |
| EP | 2611007 A2 * | 7/2013 |
| JP | 2004350492 A | 12/2004 |
| WO | 2017116428 A1 | 7/2017 |

* cited by examiner

DEBRIS TOLERANT FLUX GUIDED DOWNHOLE ROTATING MACHINE

CROSS-REFERENCE TO RELATED APPLICATION

This application claims priority to International Application Number PCT/US2018/061014 filed on Nov. 14, 2018, by Richard Decena Ornelaz and Michael Linley Fripp, entitled "Debris Tolerant Flux Guided Downhole Rotating Machine," which application claims the benefit of U.S. Provisional Application Ser. No. 62/611,038, filed on Dec. 28, 2017, by Richard Decena Ornelaz and Michael Linley Fripp, entitled "Debris Tolerant Flux Guide Generator/Motor," both of which are commonly assigned with this application and incorporated herein by reference in its entirety.

TECHNICAL FIELD

This application is directed, in general, to a hydrocarbon wellbore device and, more specifically, to a downhole rotating machine.

BACKGROUND

Generators are generally needed to provide power in a permanent completion in oil or gas wells. The generator converts some of an energy produced from flowing wellbore oil or gas into electrical power. The cheapest and most mechanically robust design has the generator exposed to the wellbore fluids. One challenge to the use of generators or motors in downhole well bore fluids is that their robustness is diminished due to iron particles, rust particles, and other ferromagnetic components, as well as sand and other debris suspended or transported in well bore fluids. The challenge arises from the small magnetic gap between the magnets of a rotor and the windings of a stator, which is typically on the order of a few thousandths of an inch. Ferromagnetic particles are attracted to the magnets and can pack into the gap between the magnets and the windings, which can impede the generator or motor from turning. Increasing the gap, however, results in significant output power and torque losses since the power or torque is inversely proportional to a size of the magnetic gap raised to the fourth power (power proportional to $1/\text{gap}^4$).

BRIEF DESCRIPTION

Reference is now made to the following descriptions taken in conjunction with the accompanying drawings, in which.

DETAILED DESCRIPTION

An improved downhole generator or motor that reduces the problem of packing but still provides sufficient power would be advantageous. Accordingly, the present disclosure is based, at least in part, on the acknowledgment that the aforementioned drawbacks of traditional downhole generators (e.g., as may be used to provide downhole power to a permanent or a temporary completion or to a drilling operation) may be overcome by enabling dramatic increases in a magnetic gap of a downhole rotating machine with limited reductions in respective generator output power or motor output torque.

The present disclosure recognizes that gap size can be increased on downhole rotating machines when using magnetic flux guides to gather magnetic flux over a large area and guide the magnetic flux into stator windings to produce power in the case of a generator or torque in the case of a motor. Accordingly, greater amounts of electrical power or torque for a given amount of magnetic flux can be achieved. Downhole rotating machines, therefore, are disclosed that have a magnetic gap separation that is a function of the overall diameter of the machines themselves. For example downhole rotating machines, such as electric generators and motors, are provided herein that have a magnetic gap separation that is at least five percent of an overall diameter of the downhole rotating machine. This overall diameter often manifests itself as a diameter of a stator or rotor of the downhole rotating machine. The magnetic gap separation is the distance of the separation between the magnets of the stator and the flux guides of the rotor. As such, the distance or size of the magnetic gap separation is not changed if a portion of the magnetic gap separation is filled with a gap spacer having a relative magnetic permeability of 10 or less.

Additionally, the downhole rotating machine may be operationally stackable with other downhole rotating machines along an axis of rotation of the rotors. This ability to stack downhole rotating machines may include stacking of generators, motors or a combination of generator and motor. Correspondingly, a downhole rotating machine may contain multiple rotors or multiple stators.

In one embodiment, the magnetic flux guides may either be attached to the teeth of the stator or serve as part of the stator and extend out in a manner that provides additional area by which magnetic flux can be collected. Because the magnetic flux guides are made of a magnetically conductive material and constructed in a magnetic flux density enhancing shape, the magnetic flux is channeled into a stator winding at a higher flux density in order to complete a pertinent magnetic circuit as rotor magnets rotate between magnetic flux guides.

In this configuration, a larger magnetic flux collection area helps to overcome the losses due to larger magnetic gaps. The magnetic flux guides also enable the magnets to be positioned in a greater variety of positions relative to the stator windings. This greater geometric positioning allows further advantages for oil field utility, thereby providing for reduced flow restrictions and dead zones. Moreover, the magnetic flux guides allow for smaller diameter generators than traditional generators and can be a better match to downhole geometries.

The downhole rotating machines can be a downhole tubular where the rotor-stator assembly of the downhole rotating machine has a magnetic flux passing substantially axially between the rotor and the stator. Accordingly, the novel generator may be used for powering one or more components in a wellbore. The novel generator can be a flow-driven generator where the magnetic flux of the generator is substantially aligned (e.g., substantially parallel) with the rotational axis thereof. In some examples the stator wirings can be positioned in a radial direction. Additionally, the magnetic flux pathway in the magnetic gap may be exposed to a wellbore fluid, and more particularly exposed to a substantially unobstructed linear flow (e.g., as compared to a tortuous flow) of wellbore fluids.

Figure 1:
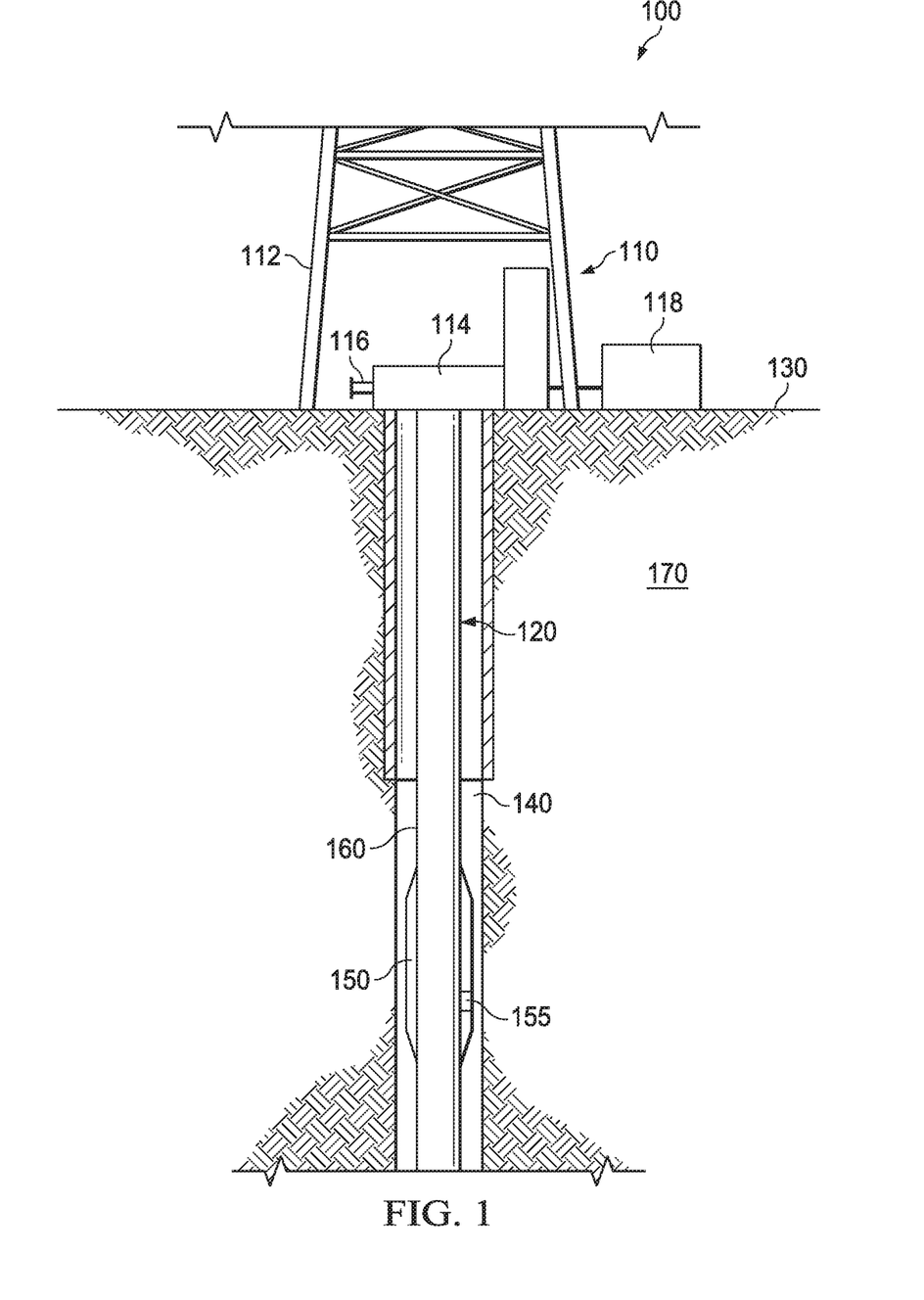
FIG. 1 illustrates a system diagram of an example wellbore system having a permanent well completion system.

FIG. 1 illustrates a system diagram of an example well system 100 having a permanent well completion system 150. The well system 100 is for obtaining hydrocarbons from a subterranean formation 170 or for injecting fluids into the subterranean formation 170. In some examples, the well system 100 is an intelligent well. The well system 100 includes surface equipment 110, the completion system 150 and an insert string 120, (e.g. a production string or production tubing, which communicatively connects the surface equipment 110 with the completion system 150).

The surface equipment 110 is located at a surface 130 and is configured to handle downhole data and remotely operate inflow control valves located downhole. The surface equipment 110 includes a rig 112, a well head 114, a production line 116 and a control or power supply unit 118. The surface equipment 110 may be conventional surface equipment and include other conventional components that are not illustrated in FIG. 1.

The completion system 150 is implemented as a lower completion that provides power and information to downhole components. The completion system 150, however, is not limited to a lower completion as it can be implemented in any well completion where there is production tubing running proximate to another tubing string. The production tubing can be, for example, a string to the surface or a liner.

The completion system 150 is fully installed within a wellbore 140 of the well system 100. The completion system 150 is communicatively connected to the surface equipment 110, especially to the control unit 118, using a communication line 160. The communication line 160 may include multiple communication or injection lines, e.g. sand face monitoring and control lines. The completion system 150, in accordance with the disclosure, further includes a downhole rotating machine 155 that is constructed in accordance with the principles of the disclosure. The downhole rotating machine 155 can be used to operate control valves or other downhole devices. In some examples, electric power generated from the downhole rotating machine 155 can be used to adjust a downhole tool that regulates formation fluid flow within the wellbore 140. For example, the completion system 150 can include a downhole tool, such as downhole tool 500 discussed below with respect to FIG. 5, that employs the downhole rotating machine 155 to control actuators for regulating fluid flow. The electric power generated from the downhole rotating machine 155 can also be used to energize wellbore instrumentation. For example, the electric power can be used to power a signal repeater to strengthen the communication of signals within the wellbore 140.

Figure 2:
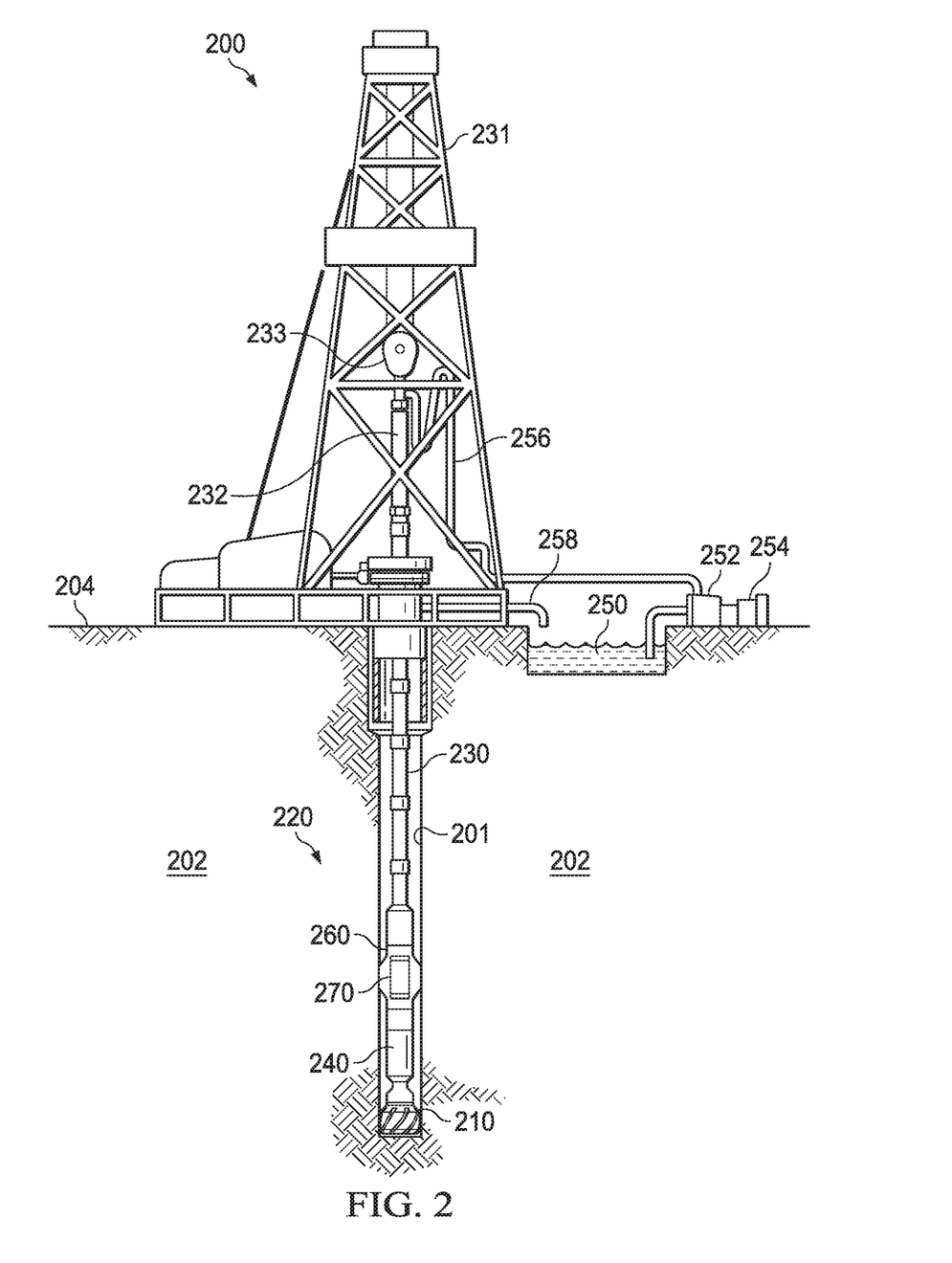
FIG. 2 illustrates a logging while drilling (LWD) system 200 configured to perform formation drilling.

FIG. 2 illustrates a logging while drilling (LWD) system 200 configured to perform formation drilling. Borehole 201 may be created by drilling into the earth 202 using a drilling tool. LWD system 200 may be configured to drive bottom hole assembly (BHA) 220 positioned or otherwise arranged at the bottom of a drill string 230 extended into the earth 202 from derrick 231 arranged at the surface 204. Derrick 231 includes a kelly 232 and a traveling block 233 used to lower and raise the kelly 232 and drill string 230.

BHA 220 may include a drill tool 210 operatively coupled to a tool string 240 which may be moved axially within wellbore 201 as attached to the tool string 240. During operation, drill tool 210 penetrates the earth 202 and thereby creates wellbore 201. BHA 220 provides directional control of drill tool 210 as it advances into earth 202. Tool string 240 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 230.

Fluid or "drilling mud" from a mud tank 250 may be pumped downhole using a mud pump 252 powered by an adjacent power source, such as a prime mover or motor 254. The drilling mud may be pumped from mud tank 250, through a stand pipe 256, which feeds the drilling mud into drill string 230 and conveys the same to drill tool 210. The drilling mud exits one or more nozzles arranged in drill tool 210 and in the process cools drill tool 210.

After exiting drill tool 210, the mud circulates back to the surface 204 via the annulus defined between the wellbore 201 and the drill string 230, and in the process, returns drill cuttings and debris to the surface. The cuttings and mud mixture are passed through a flow line 258 and are processed such that a cleaned mud is returned down hole through the stand pipe 256 once again. The BHA 220 may further include an LWD tool 260 having a downhole rotating machine 270 that provides electrical power or mechanical torque. The downhole rotating machine 270 can be an electrical generator driven by flowing drilling mud to supply electrical power to downhole tools. Additionally this electrical power can be used to power downhole electric motors to provide mechanical torque to downhole tools. As noted earlier, both of these types of downhole rotating machines are required to operate in and survive the harsh operating environment of flowing completion fluids or flowing drilling fluids. The LWD tool 260 can be the downhole tool 500 discussed below with respect to FIG. 5, that employs the downhole rotating machine 270 for operations.

Figure 3A:
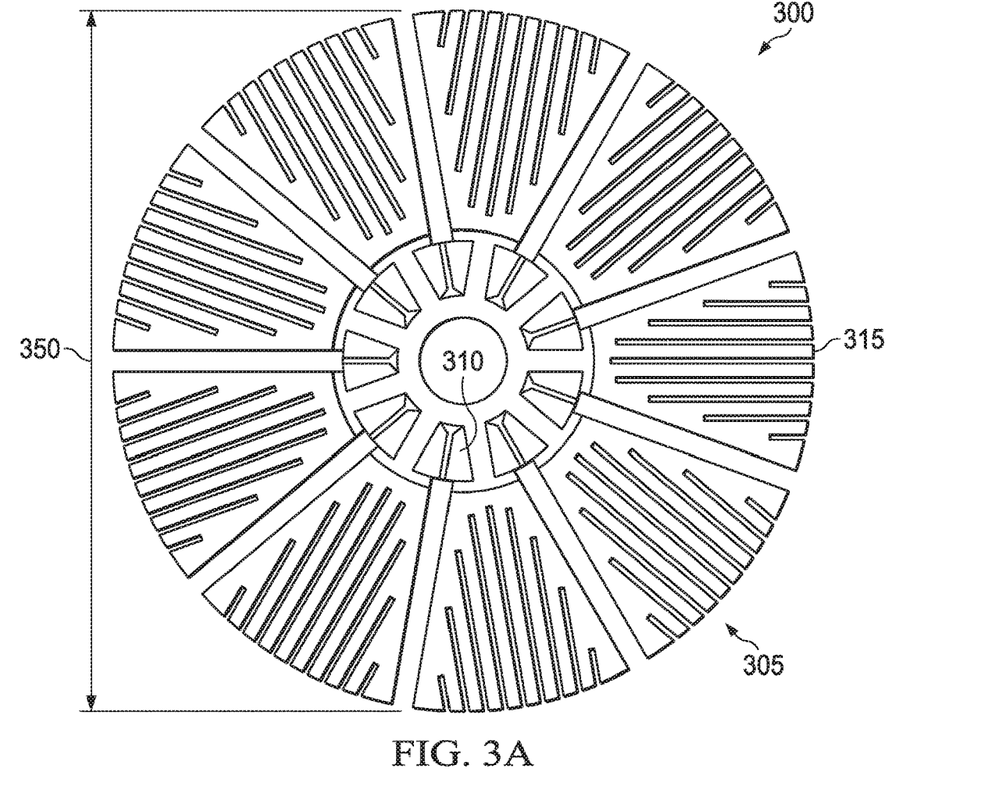
FIGS. 3A, 3B, 3C illustrate views of a downhole rotating device, generally designated 300, 325, 350, constructed according to principles of the present disclosure.
Figure 3B:
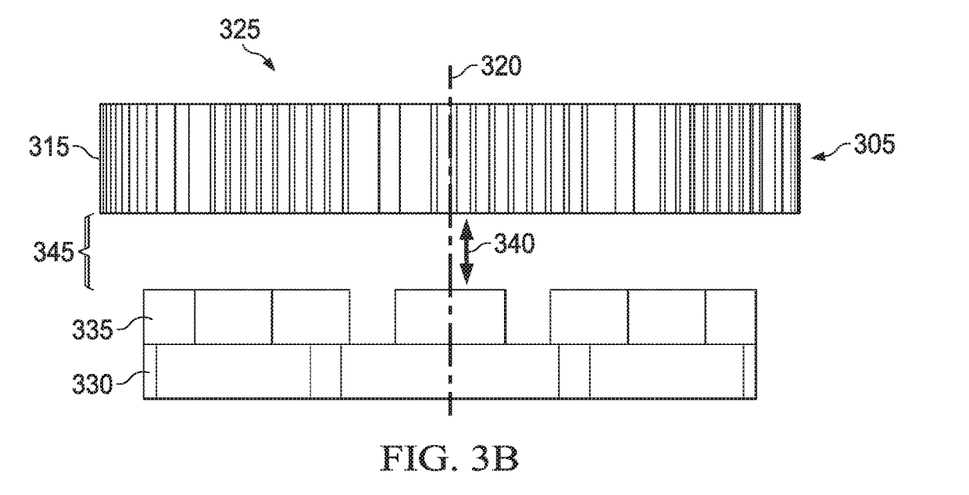
Figure 3C:
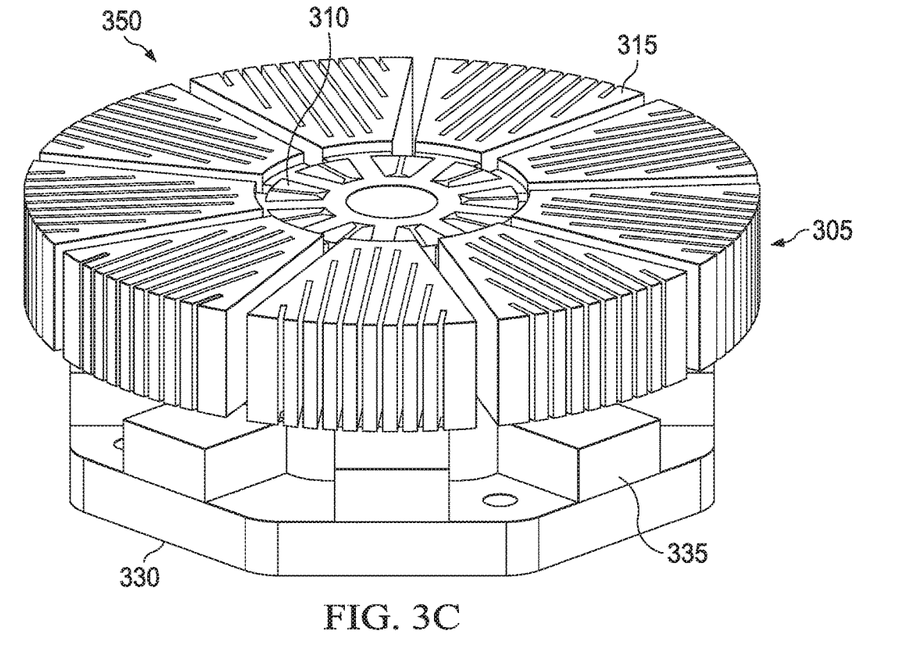

FIGS. 3A, 3B, 3C illustrate views of a downhole rotating device, generally designated 300, 325, 350, constructed according to principles of the present disclosure. FIG. 3A shows a top view (radial view), FIG. 3B shows a side view (axial view) and FIG. 3C shows an isometric view of the downhole rotating device. In each of these views, a stator 305 has stator windings 310 and corresponding tapered magnetic flux guides 315 where the stator windings 310 are located centrally to an axis of rotation 320 of the downhole rotating machine, as shown.

A rotor 330 having a plurality of magnets 335 is configured to cooperate with the stator windings 310 and the corresponding tapered magnetic flux guides 315 to generate a magnetic field 340 in a magnetic gap 345 that is substantially parallel to the axis of rotation 320 of the rotor. The magnetic gap 345 provides a magnetic gap separation between the plurality of magnets 335 and the corresponding tapered magnetic flux guides 315 that is at least five percent of an overall diameter 350 of the downhole rotating machine. The magnetic gap 345 is defined as the separation between the magnetic flux guides 315 and the plurality of magnets 335, even when the magnetic gap 345 includes a low relative permeability encapsulation that may cover at least a portion of the plurality of magnets 335 or the stator windings 310. Thus a covering of austenitic stainless steel or plastic with a relative permeability of less than 10 does not decrease the magnetic gap 345 separation distance, as defined in the present disclosure.

The tapered magnetic flux guides 315, in this embodiment, are made of a ferromagnetic material and may be attached to the stator windings or alternatively be part of a laminate shape of the stator. The tapered magnetic flux guides 315 allow the magnets to be rotated approximately 90 degrees from traditional designs so that the magnetic field 340 is vertical (e.g., substantially parallel to the axis of rotation 320), rather than radial as in the traditional design. Rotating the magnetic field 340 by approximately 90 degrees allows the large area of the magnetic flux guides 315 to be used to collect magnetic fields as shown by the large flux guides in the top and isometric views 3A, 3C. Generally, the magnetic flux guides 315 may be shapes other than pie-shaped and can include other shapes and structures that concentrate magnetic flux for stator windings (e.g., round, square or key-stone structures, etc.). Additionally, the stator windings 310 can be electrically connected in parallel, in series or in a combination of electrical parallel and series.

The rotor design is flexible, in this embodiment, and still may need adequate back iron to channel the magnetic flux to and from adjacent magnets. Moreover, the magnetic flux guides 315 can be separate from or part of the stator windings 310. In accordance with one example, the magnetic gap 345 between the flux guides 315 and the magnets 335, or at least a portion thereof, is not encased. Accordingly, the magnetic gap may be directly subject to the wellbore fluid, and any contaminants that may reside therein. Additionally, the wellbore fluid, and the direct path that it has to the magnetic gap 345 may be used to assist in removing debris from the magnetic gap 345. This debris removing feature may allow for the magnetic gap 345 to provide proper operation of the downhole rotating machine at 10 percent or even 20 percent of the overall diameter 350 of the downhole rotating machine, especially when employed in concert with higher contaminate wellbore fluids. Traditional downhole rotating devices, even if the magnetic gap were not encased, would have a tortuous path for the wellbore fluid to pass over its magnetic gap. In certain other embodiments, one or more of the stator, rotor, flux guides or other components of the downhole rotating engine is not encased.

Tapered flux guides have shown to reduce cross talk and improve power output, while slots may help reduce eddy currents. However, neither the stator 305 nor the magnetic flux guides 315 are required to be laminated or slotted nor are they required to have the laminates or slots oriented in the same direction. Moreover, the magnetic flux guides 315 do not have to be planar, and thus can be non-planar as necessary. As those skilled in the art may now appreciate, the rotor 330 can be a conventional rotor with back iron, or consist of a Halbach array or the like.

Downhole rotating machines constructed in accordance with principles of the present disclosure may operate with a minimum magnetic gap of approximately 750 micrometers (e.g., approximately 0.03 inches), while generating the power necessary to operate many downhole devices (e.g., ranging from about 1 mW to about 500 mW). In contrast to traditional generators or motors, such generators or motors may operate with magnetic gaps of approximately 3000 micrometers (e.g., approximately 0.125 inches) or more. Such large magnetic gaps, particularly when the generator or the motor itself has a diameter of approximately 125 millimeters or less, and approximately 50 millimeters or less in one embodiment, may not be achieved in traditional downhole generators and motors.

Figure 4:
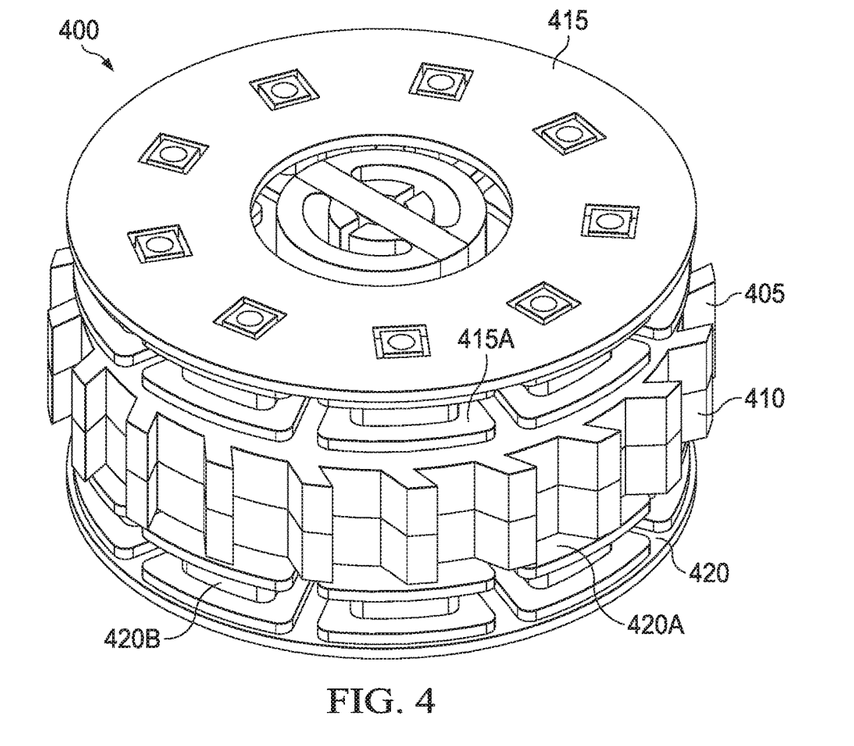
FIG. 4 illustrates another embodiment of a downhole rotating machine, generally designated 400, constructed according to the principles of the present disclosure.

FIG. 4 illustrates another embodiment of a downhole rotating machine, generally designated 400, constructed according to the principles of the disclosure. The downhole rotating machine 400 is employed as an electrical generator and includes a central rotor that has two halves 405, 410, wherein the magnets (not shown) are encapsulated between the two halves of the central rotor. The central rotor half 405 employs a stator 415, and the central rotor half 410 employs a stator 420. The stator 415 includes a corresponding plurality of tapered magnetic flux guides of which a magnetic flux guide 415A is typical, and the stator 420 includes another corresponding plurality of tapered magnetic flux guides of which a tapered magnetic flux guide 420A is typical.

Each of the tapered magnetic flux guides 415A, 420A is pie-shaped in a radial direction as was shown in FIG. 3A. Additionally, each of the tapered magnetic flux guides in FIG. 4 has a cross section shaped as an I-beam as may be seen in the example tapered magnetic flux guide 420A. Stator windings are constructed radially in a reduced middle portion (e.g., 420B) of the I-beam cross section to allow a concentrated magnetic flux to pass through the stator winding axially.

Figure 5:
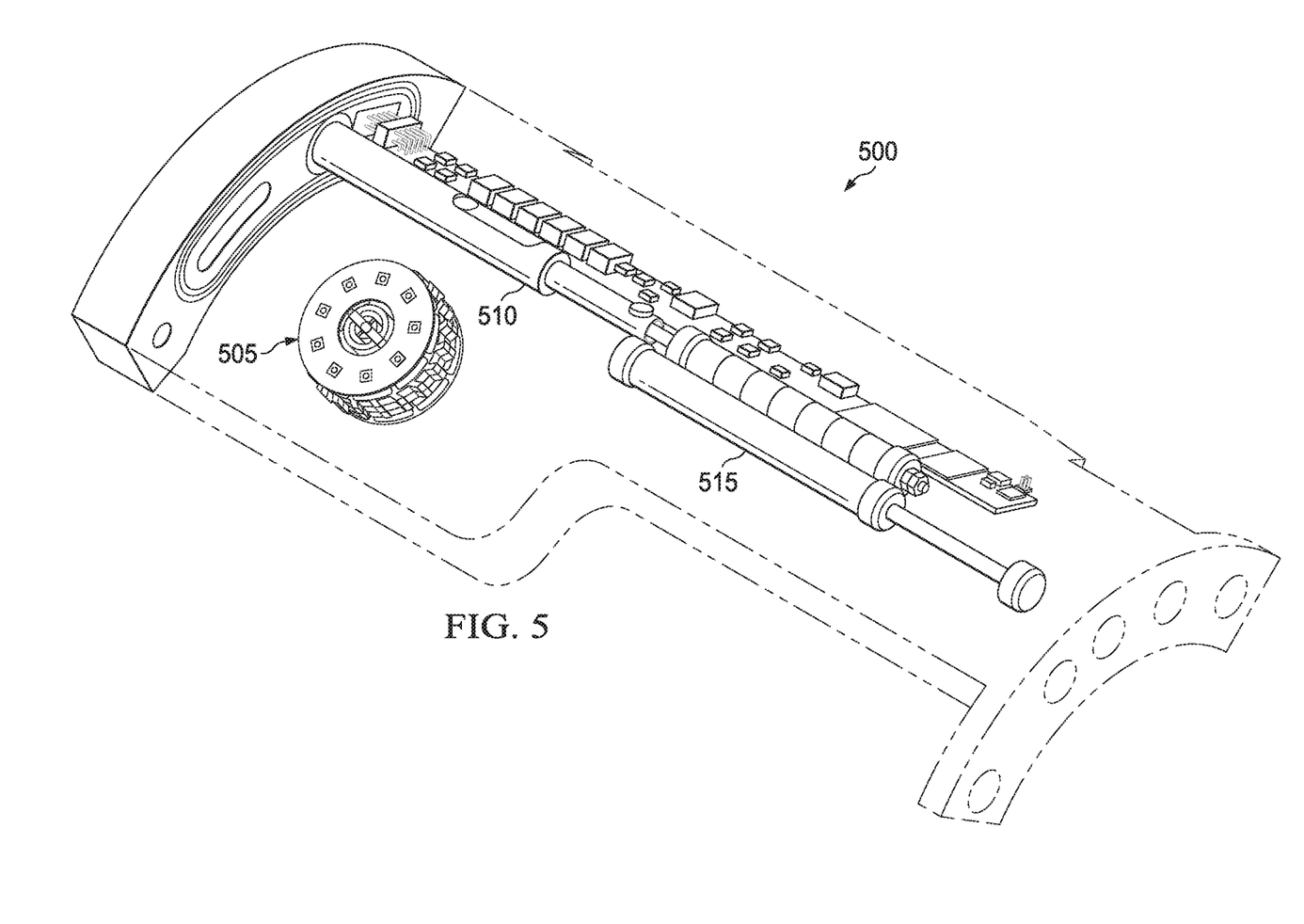
FIG. 5 illustrates an embodiment of a downhole tool constructed according to the principles of the present disclosure.

FIG. 5 illustrates an embodiment of a downhole tool, generally designated 500, constructed according to the principles of the present disclosure. The downhole tool 500 includes a downhole generator 505 constructed according to the principles of the disclosure and downhole actuators 510, 515. Flowing wellbore fluids activate the downhole generator 505 to provide electrical power to the downhole actuators 510, 515. The downhole actuators 510, 515, can be used to open or close valves to control flow within a wellbore. Control signals direct operations of the downhole actuators 510, 515 to provide a tailored (i.e., smart) operation of a completion or drilling operation. For example, the downhole tool 500 can be employed in the completion system 150 of FIG. 1 or as part of the BHA 220 of FIG. 2.

Figure 6:
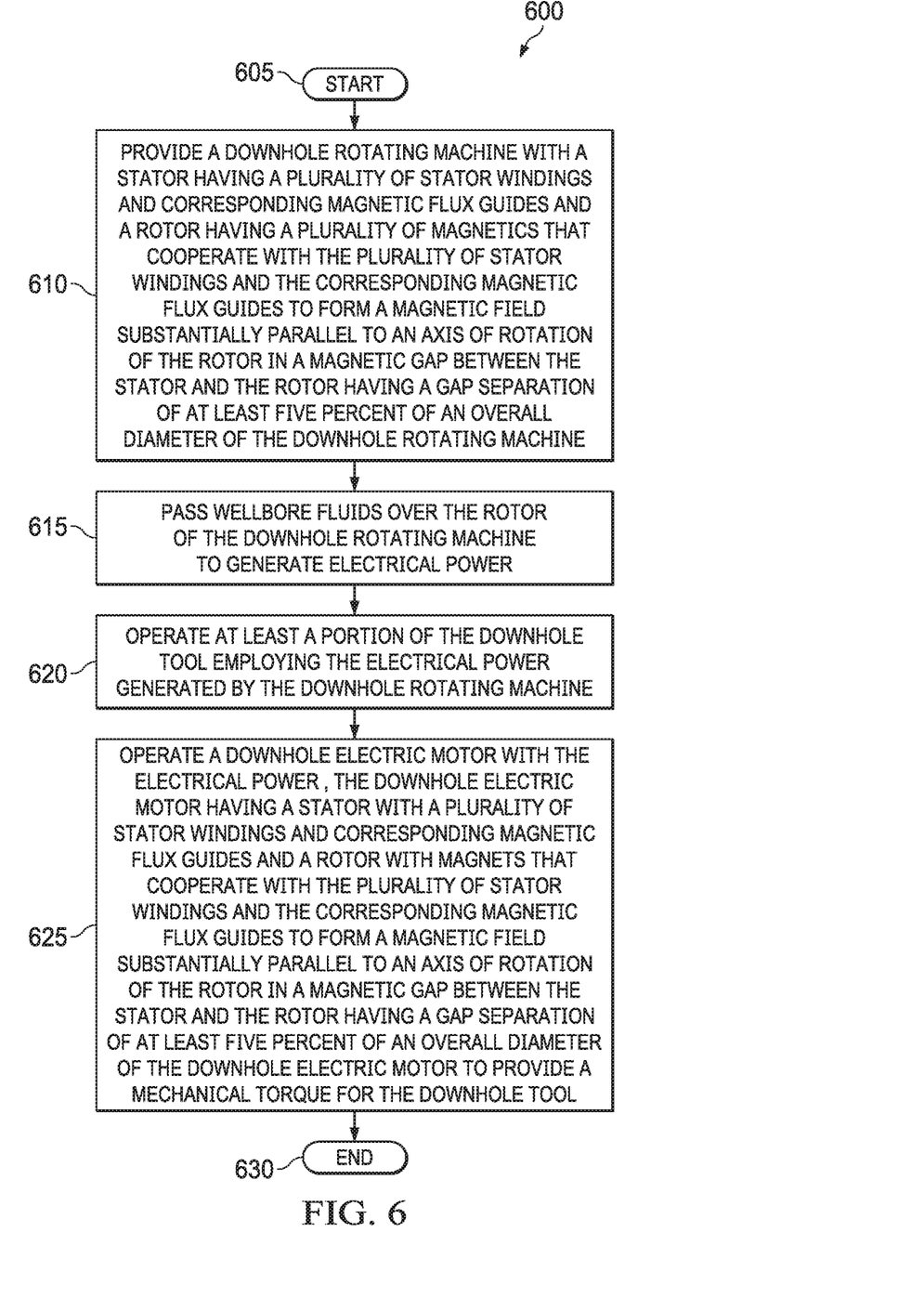
FIG. 6 illustrates a flow diagram of an embodiment of a method of operating a downhole tool in a wellbore carried out in accordance with the principles of the present disclosure.

FIG. 6 illustrates a flow diagram of an embodiment of a method of operating a downhole tool in a wellbore, generally designated 600, carried out in accordance with the principles of the present disclosure. The method starts in a step 605. Then, in a step 610, a downhole rotating machine is provided with a stator having a plurality of stator windings and corresponding magnetic flux guides and a rotor having a plurality of magnets that cooperate with the plurality of stator windings and the corresponding magnetic flux guides to form a magnetic field substantially parallel to an axis of rotation of the rotor in a magnetic gap between the stator and the rotor having a gap separation of at least five percent of an overall diameter of the downhole rotating machine. Wellbore fluids are passed over the rotor of the downhole rotating machine to generate electrical power, in a step 615, and at least a portion of the downhole tool is operated employing the electrical power generated by the downhole rotating machine, in a step 620.

In one embodiment, the downhole rotating machine is an electric generator that supplies the electrical power to operate an actuator of the downhole tool. In another embodiment, the electrical power from the downhole rotating machine operates another downhole rotating machine that provides a mechanical torque for use by the downhole tool. Correspondingly, the another downhole rotating machine is a traditional downhole electric motor. In a yet another embodiment, the electric power from the downhole rotating machine is used to energize wellbore instrumentation. In still another embodiment, the wellbore instrumentation includes an electric signal repeater that strengthens weakened wellbore electrical signals.

In a step 625, a downhole electric motor is operated by the electrical power from the downhole rotating machine, the downhole electric motor having a stator with a plurality of stator windings and corresponding magnetic flux guides and a rotor with magnets that cooperate with the plurality of stator windings and the corresponding magnetic flux guides to form a magnetic field substantially parallel to an axis of rotation of the rotor in a magnetic gap between the stator and the rotor having a gap separation of at least five percent of an overall diameter of the downhole electric motor to provide a mechanical torque for the downhole tool.

In a yet further embodiment, the downhole electric motor provides an adjustment to the downhole tool that regulates a formation fluid flow. The method 600 ends in a step 630.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Various aspects of the disclosure can be claimed including the apparatuses, systems, and methods as disclosed herein. Aspects disclosed herein include:

A. A downhole rotating machine including: (1) a stator having stator windings and corresponding magnetic flux guides, and (2) a rotor having a plurality of magnets configured to cooperate with the stator windings and the corresponding magnetic flux guides to generate a magnetic field in a magnetic gap that is substantially parallel to an axis of rotation of the rotor, wherein the magnetic gap provides a magnetic gap separation between the plurality of magnets and the corresponding magnetic flux guides that is at least five percent of an overall diameter of the downhole rotating machine.

B. A method of operating a downhole tool in a wellbore including: (1) generating electrical power by passing wellbore fluids over a rotor of a downhole rotating machine in a wellbore, and operating at least a portion of the downhole tool employing the electrical power generated by the downhole rotating machine, wherein the downhole rotating machine includes a stator having a plurality of stator windings and corresponding magnetic flux guides and a rotor having a plurality of magnets that cooperate with the plurality of stator windings and the corresponding magnetic flux guides to form a magnetic field substantially parallel to an axis of rotation of the rotor in a magnetic gap between the stator and the rotor, the magnetic gap having a gap separation of at least five percent of an overall diameter of the downhole rotating machine.

C. A downhole tool including: (1) an actuator, and (2) a downhole rotating machine. The downhole rotating machine including a stator having stator windings and corresponding magnetic flux guides and a rotor having a plurality of magnets that cooperate with the stator windings and the corresponding magnetic flux guides to generate a magnetic field in a magnetic gap that is substantially parallel to an axis of rotation of the rotor and that provides electric power or mechanical torque for operating the actuator, wherein the magnetic gap provides a magnetic gap separation between the corresponding magnetic flux guides and the plurality of magnets that is at least five percent of an overall diameter of the downhole rotating machine.

Each of the aspects A, B, and C may have one or more of the following additional elements in combination:

Element 1: wherein the corresponding magnetic flux guides provide an increased magnetic flux density through their respective stator windings. Element 2: wherein the downhole rotating machine is an electric generator or an electric motor. Element 3: wherein the overall diameter of the downhole rotating machine is a diameter of the rotor. Element 4: wherein the overall diameter of the downhole rotating machine is a diameter of the stator. Element 5: wherein the downhole rotating machine contains multiple rotors or stators. Element 6: wherein the downhole rotating machine is operationally stackable with other downhole rotating machines along the axis of rotation of the rotor. Element 7: wherein a portion of the magnetic gap separation is filled with a gap spacer having a relative magnetic permeability of 10 or less. Element 8: wherein the downhole rotating machine is an electric generator. Element 9: wherein the electrical power from the downhole rotating machine operates an actuator of the downhole tool. Element 10: wherein the electrical power from the downhole rotating machine operates another downhole rotating machine that provides a mechanical torque for use by the downhole tool. Element 11: wherein the another downhole rotating machine is a downhole electric motor. Element 12: wherein the downhole electric motor provides an adjustment to the downhole tool that regulates a formation fluid flow. Element 13: wherein the corresponding magnetic flux guides provide an increased magnetic flux density through their respective stator windings. Element 14: wherein the downhole rotating machine is an electric generator or an electric motor. Element 15: wherein the overall diameter of the downhole rotating machine is a diameter of the rotor. Element 16: wherein the overall diameter of the downhole rotating machine is a diameter of the stator. Element 17: wherein the downhole rotating machine contains multiple rotors or stators. Element 18: wherein the downhole rotating machine is operationally stackable with other downhole rotating machines along the axis of rotation of the rotor. Element 19: wherein a portion of the magnetic gap separation is filled with a gap spacer having a relative magnetic permeability of 10 or less.

Those skilled in the art to which this application relates will appreciate that other and further additions, deletions, substitutions and modifications may be made to the described embodiments.

What is claimed is:

1. A downhole rotating machine, comprising:
    a stator having stator windings and corresponding magnetic flux guides, wherein the corresponding magnetic flux guides provide an increased magnetic flux density through their respective stator windings; and
    a rotor having a plurality of magnets configured to cooperate with the stator windings and the corresponding magnetic flux guides to generate a magnetic field in a magnetic gap that is substantially parallel to an axis of rotation of the rotor,
    wherein the magnetic gap provides a magnetic gap separation between the plurality of magnets and the corresponding magnetic flux guides that is at least five percent of an overall diameter of the downhole rotating machine.

2. The downhole rotating machine as recited in claim 1 wherein the downhole rotating machine is an electric generator or an electric motor.

3. The downhole rotating machine as recited in claim 1, wherein the overall diameter of the downhole rotating machine is a diameter of the rotor.

4. The downhole rotating machine as recited in claim 1, wherein the overall diameter of the downhole rotating machine is a diameter of the stator.

5. The downhole rotating machine as recited in claim 1, wherein the downhole rotating machine contains multiple rotors or stators.

6. The downhole rotating machine as recited in claim 1, wherein the downhole rotating machine is operationally stackable with other downhole rotating machines along the axis of rotation of the rotor.

7. The downhole rotating machine as recited in claim 1, wherein a portion of the magnetic gap separation is filled with a gap spacer having a relative magnetic permeability of 10 or less.

8. A method of operating a downhole tool in a wellbore, comprising:
   generating electrical power by passing wellbore fluids over a rotor of a downhole rotating machine in a wellbore; and
   operating at least a portion of the downhole tool employing the electrical power generated by the downhole rotating machine, wherein the downhole rotating machine includes a stator having a plurality of stator windings and corresponding magnetic flux guides and the rotor having a plurality of magnets that cooperate with the plurality of stator windings and the corresponding magnetic flux guides to form a magnetic field substantially parallel to an axis of rotation of the rotor in a magnetic gap between the stator and the rotor, the magnetic gap having a gap separation of at least five percent of an overall diameter of the downhole rotating machine.

9. The method as recited in claim 8 wherein the downhole rotating machine is an electric generator.

10. The method as recited in claim 8 wherein the electrical power from the downhole rotating machine operates an actuator of the downhole tool.

11. The method as recited in claim 8 wherein the electrical power from the downhole rotating machine operates another downhole rotating machine that provides a mechanical torque for use by the downhole tool.

12. The method as recited in claim 11 wherein the another downhole rotating machine is a downhole electric motor.

13. The method as recited in claim 12 wherein the downhole electric motor provides an adjustment to the downhole tool that regulates a formation fluid flow.

14. A downhole tool, comprising:
   an actuator; and
   a downhole rotating machine, the downhole rotating machine including a stator having stator windings and corresponding magnetic flux guides and a rotor having a plurality of magnets that cooperate with the stator windings and the corresponding magnetic flux guides to generate a magnetic field in a magnetic gap that is substantially parallel to an axis of rotation of the rotor and that provides electric power or mechanical torque for operating the actuator, wherein:
      the magnetic gap provides a magnetic gap separation between the corresponding magnetic flux guides and the plurality of magnets that is at least five percent of an overall diameter of the downhole rotating machine: and
      the downhole rotating machine generates electrical power by passing wellbore fluids over the rotor.

15. The downhole tool as recited in claim 14 wherein the corresponding magnetic flux guides provide an increased magnetic flux density through their respective stator windings.

16. The downhole tool as recited in claim 14 wherein the downhole rotating machine is an electric generator or an electric motor.

17. The downhole tool as recited in claim 14, wherein the overall diameter of the downhole rotating machine is a diameter of the rotor.

18. The downhole tool as recited in claim 14, wherein the overall diameter of the downhole rotating machine is a diameter of the stator.

19. The downhole tool as recited in claim 14 wherein the downhole rotating machine contains multiple rotors or stators.

20. The downhole tool as recited in claim 14, wherein the downhole rotating machine is operationally stackable with other downhole rotating machines along the axis of rotation of the rotor.

21. The downhole tool as recited in claim 14, wherein a portion of the magnetic gap separation is filled with a gap spacer having a relative magnetic permeability of 10 or less.

* * * * *